(12) United States Patent
Witmer et al.

(10) Patent No.: US 11,914,201 B2
(45) Date of Patent: Feb. 27, 2024

(54) MECHANISMS THAT TRANSFER LIGHT BETWEEN LAYERS OF MULTI-CHIP PHOTONIC ASSEMBLIES

(71) Applicant: Apple Inc., Cupertino, CA (US)

(72) Inventors: Jeremy D. Witmer, San Jose, CA (US); Alfredo Bismuto, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/750,082

(22) Filed: May 20, 2022

(65) Prior Publication Data

US 2023/0085761 A1 Mar. 23, 2023

Related U.S. Application Data

(60) Provisional application No. 63/310,397, filed on Feb. 15, 2022, provisional application No. 63/247,726, filed on Sep. 23, 2021.

(51) Int. Cl.
*G02B 6/42* (2006.01)

(52) U.S. Cl.
CPC ............ *G02B 6/423* (2013.01); *G02B 6/4262* (2013.01)

(58) Field of Classification Search
CPC .............................. G02B 6/4262; G02B 6/423
See application file for complete search history.

(56) References Cited

U.S. PATENT DOCUMENTS

| | | |
|---|---|---|
| 5,488,678 A | 1/1996 | Taneya |
| 5,577,142 A | 11/1996 | Mueller-Fiedler et al. |
| 6,330,378 B1 | 12/2001 | Forrest |
| 6,393,185 B1 | 5/2002 | Deacon |
| 6,461,059 B2 | 10/2002 | Ando et al. |
| 6,465,929 B1 | 10/2002 | Levitan et al. |
| 6,519,382 B1 | 2/2003 | Jurbergs |
| 6,594,409 B2 | 7/2003 | Dutt et al. |

(Continued)

FOREIGN PATENT DOCUMENTS

| | | |
|---|---|---|
| JP | H07297324 | 11/1995 |
| WO | WO 14/141451 | 9/2014 |

(Continued)

OTHER PUBLICATIONS

Bogaerts, et al., "Off-Chip Coupling," *Handbook of Silicon Photonics*, CRC Press, Apr. 2013, 43 pages.

(Continued)

*Primary Examiner* — Sung H Pak
(74) *Attorney, Agent, or Firm* — Brownstein Hyatt Farber Schreck, LLP

(57) ABSTRACT

A multi-chip photonic assembly includes first and second photonic integrated circuits having first and second waveguides vertically stacked such that first vertical dimensions of the first and second waveguides occupy different horizontal planes in the stack. At least one of the first and second waveguides has a region that has a second vertical dimension that is larger than the first vertical dimension and either horizontally overlaps the other waveguide and/or vertically contacts the other waveguide. Light moving through one of the waveguides from the first vertical dimension to the other vertical dimension changes modes vertically so that the light moves from one waveguide to the other.

24 Claims, 8 Drawing Sheets

(56) References Cited

U.S. PATENT DOCUMENTS

| | | |
|---|---|---|
| 6,628,858 B2 | 9/2003 | Zhang |
| 6,657,723 B2 | 12/2003 | Cohen |
| 6,795,622 B2 | 9/2004 | Forrest |
| 6,801,679 B2 | 10/2004 | Koh |
| 6,801,683 B2 | 10/2004 | Kanie et al. |
| 6,823,098 B2 | 11/2004 | Guidotti et al. |
| 6,873,763 B2 | 3/2005 | Nikonov |
| 6,898,222 B2 | 5/2005 | Hennig et al. |
| 6,904,191 B2 | 6/2005 | Kubby |
| 6,935,792 B2 | 8/2005 | Saia et al. |
| 6,940,182 B2 | 9/2005 | Hilton et al. |
| 6,947,639 B2 | 9/2005 | Singh |
| 6,952,504 B2 | 10/2005 | Bi |
| 6,955,481 B2 | 10/2005 | Colgan et al. |
| 6,975,465 B1 | 12/2005 | Chung |
| 7,054,517 B2 | 5/2006 | Mossberg |
| 7,058,245 B2 | 6/2006 | Farahi |
| 7,062,114 B2 | 6/2006 | Webjorn |
| 7,079,715 B2 | 7/2006 | Kish |
| 7,085,445 B2 | 8/2006 | Koh |
| 7,203,401 B2 | 4/2007 | Mossberg |
| 7,209,611 B2 | 4/2007 | Joyner |
| 7,245,379 B2 | 7/2007 | Schwabe |
| 7,283,694 B2 | 10/2007 | Welch |
| 7,315,039 B2 | 1/2008 | Kitagawa |
| 7,366,364 B2 | 4/2008 | Singh |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,577,327 B2 | 8/2009 | Blauvelt et al. |
| 7,612,881 B2 | 11/2009 | Ban et al. |
| 7,680,364 B2 | 3/2010 | Nilsson |
| 7,720,328 B2 | 5/2010 | Yan |
| 7,885,492 B2 | 2/2011 | Welch |
| 7,974,504 B2 | 7/2011 | Nagarajan |
| 8,548,287 B2 | 10/2013 | Thacker et al. |
| 8,659,813 B2 | 2/2014 | Davis et al. |
| 8,774,569 B2 | 7/2014 | Dougherty et al. |
| 9,031,412 B2 | 5/2015 | Nagarajan |
| 9,064,988 B2 | 6/2015 | Hsiao et al. |
| 9,091,594 B2 | 7/2015 | Furstenberg et al. |
| 9,310,248 B2 | 4/2016 | Karlsen et al. |
| 9,405,066 B2 | 8/2016 | Mahgerefteh |
| 9,715,064 B1 | 7/2017 | Gambino et al. |
| 9,874,701 B2 | 1/2018 | Baets et al. |
| 9,880,352 B2 | 1/2018 | Florjanczyk |
| 10,009,668 B2 | 6/2018 | Liboiron-Ladouceur |
| 10,046,229 B2 | 8/2018 | Tran et al. |
| 10,067,426 B2 | 9/2018 | Pandey |
| 10,203,762 B2 | 2/2019 | Bradski et al. |
| 10,268,043 B2 | 4/2019 | Zhou et al. |
| 10,283,939 B2 | 5/2019 | Dawson et al. |
| 10,295,740 B2 | 5/2019 | Bourstein et al. |
| 10,310,196 B2 | 6/2019 | Hutchison |
| 10,374,699 B2 | 8/2019 | Ji et al. |
| 10,429,582 B1 | 10/2019 | Bian et al. |
| 10,511,146 B2 | 12/2019 | Lebby et al. |
| 10,529,003 B2 | 1/2020 | Mazed |
| 10,634,843 B2 | 4/2020 | Bayn et al. |
| 10,656,429 B2 | 5/2020 | Zhou et al. |
| 10,823,912 B1 | 11/2020 | Pelc et al. |
| 10,985,524 B1 | 4/2021 | Bayn et al. |
| 11,086,088 B2 | 8/2021 | Huebner et al. |
| 11,320,718 B1 | 5/2022 | Mahmoud et al. |
| 11,500,139 B2 | 11/2022 | Zhou et al. |
| 11,525,967 B1 | 12/2022 | Bismuto et al. |
| 2004/0208428 A1 | 10/2004 | Kikuchi et al. |
| 2006/0002443 A1 | 1/2006 | Farber et al. |
| 2006/0045144 A1 | 3/2006 | Karlsen et al. |
| 2006/0045158 A1 | 3/2006 | Li |
| 2006/0182445 A1 | 8/2006 | Lee et al. |
| 2008/0044128 A1 | 2/2008 | Kish et al. |
| 2008/0226224 A1* | 9/2008 | Blauvelt ............... G02B 6/42 385/14 |
| 2009/0103580 A1 | 4/2009 | Farmer et al. |
| 2013/0121635 A1* | 5/2013 | Thacker ............ G02B 6/1228 29/428 |
| 2014/0029943 A1 | 1/2014 | Mathai et al. |
| 2019/0339468 A1 | 11/2019 | Evans et al. |
| 2019/0342009 A1 | 11/2019 | Evans et al. |
| 2019/0342010 A1 | 11/2019 | Evans et al. |
| 2020/0152615 A1 | 5/2020 | Krasulick et al. |
| 2020/0393615 A1 | 12/2020 | Bayn et al. |
| 2022/0021179 A1 | 1/2022 | Lee et al. |
| 2022/0221649 A1 | 7/2022 | Sakamoto et al. |
| 2023/0011177 A1 | 1/2023 | Arbore |
| 2023/0012376 A1 | 1/2023 | Arbore et al. |
| 2023/0107907 A1 | 4/2023 | Bismuto et al. |

FOREIGN PATENT DOCUMENTS

| | | |
|---|---|---|
| WO | WO 19/152990 | 8/2019 |
| WO | WO 20/086744 | 4/2020 |
| WO | WO 20/106974 | 5/2020 |
| WO | WO 20/240796 | 12/2020 |
| WO | WO 21/116766 | 6/2021 |

OTHER PUBLICATIONS

Chang et al., "A Comb-Drive Actuator Driven by Capacitively-Coupled-Power," *Sensors*, 2012, pp. 10881-10889.

Dhoore et al., "Novel adiabatic tapered couplers for active III-V/SOI devices fabricated through transfer printing," Ghent University, Belgium, Optical Society of America, 2016, 16 pages.

He et al., "Integrated Polarization Compensator for WDM Waveguide Demultiplexers," *IEEE Photonics Technology Letters* vol. 11, No. 2, Feb. 1999, pp. 224-226.

Holmstrom et al., "MEMS Laser Scanners: A Review," *Journal of Microelectromechanical Systems*, vol. 23, No. 2, 2014, pp. 259-275.

Komljenovic et al., "Photonic Integrated Circuits Using Heterogeneous Integration on Silicon," Proceedings of the IEEE 2018, pp. 1-12.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Milanovic et al., "Compact MEMS Mirror Based Q-Switch Module for Pulse-on-demand Laser Range Finders," presented at SPIE Conference on MOEMS and Miniaturized Systems XIV, San Francisco, California, 2015, 7 pages.

Schiappelli et al., "Efficient fiber-to-waveguide coupling by a lens on the end of the optical fiber fabricated by focused ion beam milling," *Microelectronic Engineering*, 73-74, 2004, pp. 397-404.

Tsai et al., "A Laminate Cantilever Waveguide Optical Switch," 2012, downloaded Sep. 19, 2021 from IEEE Xplore, pp. 203-207.

Worhoff et al., "Flip-chip assembly for photonic circuits," MESA+ Research Institute, University of Twente, Integrated Optical MicroSystems Group, The Netherlands, 12 pages.

U.S. Appl. No. 17/859,813, filed Jul. 7, 2022, Arbore.
U.S. Appl. No. 17/859,912, filed Jul. 7, 2022, Arbore et al.
U.S. Appl. No. 18/079,672, filed Dec. 12, 2022, Bismuto et al.
U.S. Appl. No. 18/121,427, filed Mar. 14, 2023, Pelc et al.

* cited by examiner

MECHANISMS THAT TRANSFER LIGHT BETWEEN LAYERS OF MULTI-CHIP PHOTONIC ASSEMBLIES

CROSS-REFERENCE TO RELATED APPLICATIONS

This application claims the benefit under 35 U.S.C. § 119(e) of U.S. Provisional Patent Application No. 63/247,726, filed Sep. 23, 2021, and of U.S. Provisional Patent Application No. 63/310,397, filed Feb. 15, 2022, the contents of each of which are incorporated herein by reference in their entirety.

FIELD

The described embodiments relate generally to photonic integrated circuits. More particularly, the present embodiments relate to mechanisms that transfer light between photonic integrated circuits.

BACKGROUND

Microelectronics relates to manufacture (or microfabrication) of very small electronic designs and components. One example of such devices, digital integrated circuits, may be made from semiconductor materials and may include components like transistors, capacitors, inductors, resistors, diodes, insulators, and conductors. Wiring techniques like wire bonding are often used in digital integrated circuits and other microelectronics because of the unusually small size of the components, leads, and pads. Various techniques may be used to connect multiple digital integrated circuits in order to build complex systems.

Some typical integrated circuits may be multi-layer circuits, where electrical signals are routed through traces on opposing sides of a single substrate or on traces defined on various stacked substrates. Vias may extend through a substrate to permit electrical signals to travel from one layer or substrate or side to another. Generally, such vias are formed from a copper fill.

Photonic integrated circuits (or integrated optical circuits) are devices that integrate certain photonic functions, generally replacing electrical signals with photonic (e.g., light-based) signals. In certain ways, photonic integrated circuits are similar to a digital integrated circuit. The major difference between photonic integrated circuits and a digital integrated circuit is that a photonic integrated circuit utilizes light as a signal medium rather than electricity, which in turn requires the use of optical components rather than conventional circuitry. While electrical signals may change layers by propagating through electrical vias in typical integrated circuits, there are few such options for optical signals of a photonic integrated circuit. Thus, optical signals are typically routed in a single layer or plane of such a circuit, constraining design options.

SUMMARY

The present disclosure relates to multi-chip photonic assemblies. First and second photonic integrated circuits having first and second waveguides may be vertically stacked such that first vertical dimensions of the first and second waveguides occupy different horizontal planes in the stack. At least one of the first and second waveguides has a region that has a second vertical dimension that is larger than the first vertical dimension and either horizontally overlaps the other waveguide and/or vertically contacts the other waveguide. Light moving through one of the waveguides from the first vertical dimension to the other vertical dimension changes modes vertically so that the light moves from one waveguide to the other.

In various embodiments, a multi-chip photonic assembly includes a first photonic integrated circuit including a first waveguide having a first region that occupies a first horizontal plane and has a first vertical dimension and a second region that has a second vertical dimension that is larger than the first vertical dimension, the second region including a first adiabatic taper. The multi-chip photonic assembly also includes a second photonic integrated circuit, including a second waveguide, stacked vertically over the first photonic integrated circuit, the second waveguide having a third region that occupies a second horizontal plane and has a third vertical dimension and a fourth region that has a fourth vertical dimension that is larger than the third vertical dimension, the fourth region including a second adiabatic taper. The second region is positioned in the second horizontal plane. The second region and the fourth region change a mode of light travelling between the first photonic integrated circuit and the second photonic integrated circuit.

In some examples, the second region overlaps the fourth region in the first horizontal plane and the second horizontal plane. In various implementations of such examples, the multi-chip photonic assembly further includes an anti-reflection coating positioned between the second region and the fourth region. In some implementations of such examples, the first adiabatic taper tapers horizontally from a first side of the second region that faces the fourth region to a second side of the second region that is opposite the first side. In a number of implementations of such examples, the first adiabatic taper tapers vertically from a first side of the second region that faces the fourth region to a second side of the second region that is opposite the first side. In some implementations of such examples, the second region and the fourth region cooperate to define a gap between the second region and the fourth region and the gap is filled with at least one of air or an optically clear underfill.

In a number of examples, the second region includes a first angled facet and the fourth region includes a second angled facet that faces the first angled facet in the first horizontal plane and the second horizontal plane.

In some embodiments, a multi-chip photonic assembly includes a first photonic integrated circuit including a first waveguide having a first region that occupies a first horizontal plane and has a first vertical dimension and a second region that has a second vertical dimension that is larger than the first vertical dimension, the second region having a first adiabatic taper. The multi-chip photonic assembly also includes a second photonic integrated circuit, including a second waveguide, stacked vertically over the first photonic integrated circuit, the second waveguide having a third region that occupies a second horizontal plane and has a third vertical dimension and a fourth region that has a fourth vertical dimension that is larger than the third vertical dimension, the fourth region including a second adiabatic taper. The second region vertically contacts the second waveguide. The second region and the fourth region change a mode of light travelling between the first photonic integrated circuit and the second photonic integrated circuit.

In various examples, the second region vertically contacts the second waveguide via an optically clear adhesive. In some examples, the multi-chip photonic assembly further includes an adiabatic transfer region where the second adiabatic taper vertically overlaps the first adiabatic taper. In various implementations of such examples, the light travels between the first waveguide and the second waveguide where the second region vertically contacts the second waveguide.

In some examples, the multi-chip photonic assembly further includes cladding material positioned between the first waveguide and the second waveguide. In a number of examples, the first adiabatic taper tapers opposite the second adiabatic taper. In some examples, the second region is positioned proximate the fourth region and opposite the third region.

In a number of embodiments, a multi-chip photonic assembly includes a first photonic integrated circuit including a first waveguide having a first region that occupies a first horizontal plane and has a first vertical dimension and a second region that has a second vertical dimension that is larger than the first vertical dimension. The multi-chip photonic assembly further includes a second photonic integrated circuit, including a second waveguide that occupies a second horizontal plane, stacked vertically over the first photonic integrated circuit. The second region is positioned in the second horizontal plane. The second region changes a mode of light travelling between the first photonic integrated circuit and the second photonic integrated circuit.

In various examples, the second region uses interference between optical modes to transfer the light travelling between the first photonic integrated circuit and the second photonic integrated circuit. In some examples, the second region has a uniform horizontal dimension from a first side of the second region that faces the second waveguide to a second side of the second region that is opposite the first side. In a number of examples, the second vertical dimension is uniform from a first side of the second region that faces the second waveguide to a second side of the second region that is opposite the first side. In various examples, the first waveguide defines a gap horizontally between the second region and the second waveguide. In some examples, the second waveguide has a third vertical dimension that is smaller than the second vertical dimension.

In various examples a multi-chip photonic assembly includes a first photonic integrated circuit having a first waveguide, the first waveguide having a first region that occupies a first horizontal plane and has a first vertical dimension and a second region that has a second vertical dimension that is larger than the first vertical dimension. The second region includes a first waveguide material and a second waveguide material overlaying the first waveguide material and having a lower refractive index than the first waveguide material. The multi-chip photonic assembly also includes a second photonic integrated circuit having a second waveguide and stacked vertically over the first photonic integrated circuit. The second waveguide has a third region that occupies a second horizontal plane and has a third vertical dimension and a fourth region that has a fourth vertical dimension that is larger than the third vertical dimension. The fourth region includes a third waveguide material and a fourth waveguide material overlaying third first waveguide material and having a lower refractive index than the third waveguide material. The second region is positioned in the second horizontal plane, and the second region and the fourth region change a mode of light travelling between the first photonic integrated circuit and the second photonic integrated circuit.

In some examples, the first region includes a first segment of the first waveguide material, the second region includes a second segment of the first waveguide material, and a width of the second segment tapers adiabatically in the second region. Additionally or alternatively, the third region includes a third segment of the third waveguide material, the second region includes a fourth segment of the fourth waveguide material, and a width of the fourth segment tapers adiabatically in the fourth region. In some instances, the second segment terminates prior to a distal end of the second region. Additionally or alternatively, the fourth segment terminates prior to a distal end of the fourth region.

In a number of examples, the first waveguide material and the third waveguide material are the same material. Additionally or alternatively, the second waveguide material and the fourth waveguide material are the same material. In some examples, the first photonic integrated circuit defines a cavity and the fourth region extends at least partially into the cavity of the first photonic device. Additionally or alternatively, the second photonic integrated circuit defines a cavity and the second region extends at least partially into the cavity of the second photonic device.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
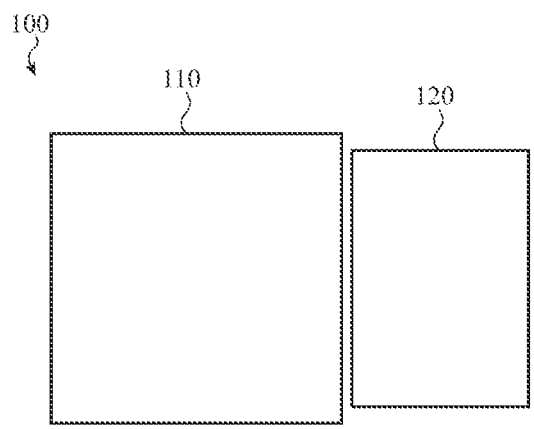
FIG. 1 depicts a top view of a first example multi-chip photonic assembly.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

The ability to flexibly connect multiple digital integrated circuit chips together may be critical for building complex systems in microelectronics. Having similar flexibility for photonic integrated circuits, such as flip chip or side by side arrangements, may also be valuable. By way of illustration, splitting of the functionality of a photonic integrated circuit between two or more chips in a flip chip configuration may lead to a much smaller overall footprint, which may be especially important for mobile or wearable applications where space may be extremely limited. This may also increase modularity, providing photonic system designers the flexibility to mix and match different components, which may be useful for applications like rapid prototyping or optimal wavelength binning during manufacturing. Splitting up functionality may also open up new fabrication possibilities, since different chips could be run with separate, potentially incompatible process flows.

For example, a photonic integrated circuit may include a Mach-Zehnder interferometer, an Echelle grating, and an optical phased array passive delay line network. The optical phased array passive delay line network may occupy a relatively large area of the photonic integrated circuit. By splitting the photonic integrated circuit into a first photonic integrated circuit having the Mach-Zehnder interferometer and the Echelle grating and a second photonic integrated circuit having the optical phased array passive delay line network couplable to the first photonic circuit in a flip chip or other arrangement, a much smaller overall footprint may be achieved.

By way of another example, a photonic integrated circuit may include a first wafer having a first crystalline orientation and a second wafer having a second crystalline orientation. As the two orientations are different, the two wafers are separate from one another. However, light may pass from one wafer (or one component on that wafer) to the other wafer (or a second component on that wafer) as part of the operation of the photonic integrated circuit. Embodiments described herein may facilitate the use of wafers with different crystalline orientations in the same multi-chip photonic assembly by simplifying light transmission therebetween, while conserving space of the overall assembly.

In yet another example, a photonic integrated circuit may include a laser and a grating that need to be have their optical wavelengths precisely matched. Splitting the laser and the grating onto different photonic integrated circuits may enable optimal wavelength binning of the laser and the grating during manufacturing to enable use of photonic integrated circuits including lasers to be used with photonic integrated circuits including gratings that appropriately match the lasers.

In still another example, splitting components of a photonic integrated circuit into multiple photonic integrated circuits may increase yield. This may be due to the fact that a component that does not meet one or more sets of requirements or standards may cause only the respective photonic integrated circuit to include that component as opposed to the photonic integrated circuit that includes all of the components.

One of the main challenges of multi-chip architectures in photonics is that it is difficult to transfer light from one chip to another without losing a large amount of the light. The present disclosure may address this issue by providing mechanisms to transfer light between photonic chips, such as in a flip chip arrangement, without incurring large optical losses.

The following disclosure relates to multi-chip photonic assemblies. First and second photonic integrated circuits having first and second waveguides may be vertically stacked such that first portions (having first vertical dimensions) of the first and second waveguides occupy different horizontal planes in the stack. At least one of the first and second waveguides has a region with a second vertical dimension that is larger than the first vertical dimension; this second vertical dimension either horizontally overlaps the other waveguide and/or vertically contacts the other waveguide. Light moving through one of the waveguides from the first vertical dimension to the other vertical dimension changes modes vertically so that the light moves from one waveguide to the other.

These and other embodiments are discussed below with reference to FIGS. 1-8C. However, those skilled in the art will readily appreciate that the detailed description given herein with respect to these Figures is for explanatory purposes only and should not be construed as limiting.

FIG. 1 depicts a top view of a first example multi-chip photonic assembly 100. The multi-chip photonic assembly 100 includes a first photonic integrated circuit 110 coupled to a second photonic integrated circuit 120 in a side by side arrangement. As the first photonic integrated circuit 110 and the second photonic integrated circuit 120 are coupled side by side, the overall footprint of the multi-chip photonic assembly 100 is the same as the overall footprint of the first photonic integrated circuit 110 plus that of the second photonic integrated circuit 120.

Figure 2A:
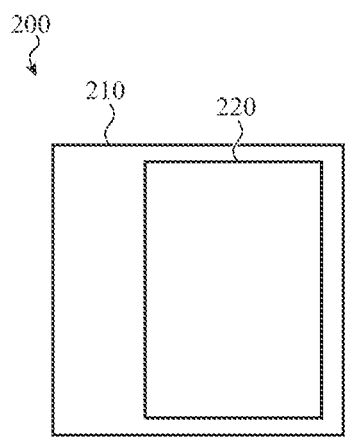
FIG. 2A depicts a top view of a second example multi-chip photonic assembly.
Figure 2B:
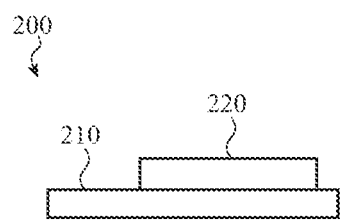
FIG. 2B depicts a side view of the multi-chip photonic assembly of FIG. 2A.

FIG. 2A depicts a top view of a second example multi-chip photonic assembly 200, while FIG. 2B depicts a side view of the multi-chip photonic assembly 200 of FIG. 2A. With respect to FIGS. 2A and 2B, the multi-chip photonic assembly 200 includes a first photonic integrated circuit 210 coupled to a second photonic integrated circuit 220 in a flip chip arrangement. Generally and for example comparative purposes, the first photonic integrated circuit 210 has a same area as that of the first photonic integrated circuit 110 shown in FIG. 1, and the second photonic integrated circuit 220 has a same area as that of the second photonic integrated circuit 120 of FIG. 1. As the first photonic integrated circuit 210 and the second photonic integrated circuit 220 are stacked vertically (e.g., with one atop the other), the overall footprint of the multi-chip photonic assembly 200 is significantly smaller than that of the multi-chip photonic assembly 100 of FIG. 1. However, in order for the first and second photonic integrated circuits 210, 220 to operate together, light must be transferred between them.

Figure 3:
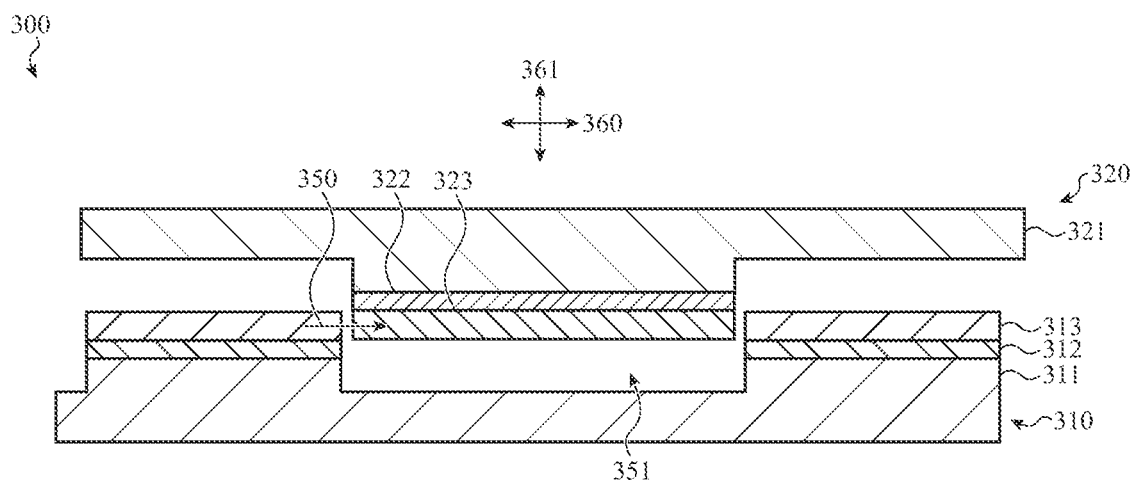
FIG. 3 depicts a side view of a third example multi-chip photonic assembly.

FIG. 3 depicts a side view of a third example multi-chip photonic assembly 300. The multi-chip photonic assembly 300 may include a first photonic integrated circuit 310 (or a bottom chip) coupled to a second photonic integrated circuit 320 (or a top chip) stacked vertically (with respect to a vertical axis 361) in a flip chip arrangement, similar to the arrangement shown in FIGS. 2A-2B. The first photonic integrated circuit 310 may include a first substrate 311 (such as silicon), a first buried oxide layer 312, and a first waveguide 313. Similarly, the second photonic integrated circuit 320 may include a second substrate 321 (such as silicon), a second buried oxide layer 322, and a second waveguide 323. Generally, the term "buried oxide layer," as used herein, is intended to cover any buried low-index optical cladding layer made from any suitable material having lower refractive index than the waveguide material (or materials), only one example of which is silicon oxide. Similarly, waveguides discussed herein may be made from silicon, a combination of materials such as a high-index material with a lower-index cladding (e.g., Si/SiO2, Si/SiN, or the like), and so on. In other words first and/or second the photonic integrated circuits may optionally include one or more additional low-index optical cladding layers to provide optical confinement to the waveguides in one or more transverse directions.

The first photonic integrated circuit 310 defines a cavity 351 such that the first waveguide 313 and the second waveguide 323 (which may both have a uniform vertical dimension) may occupy the same horizontal plane (with respect to a horizontal axis 360). Light 350 may be transmitted between the first waveguide 313 and the second waveguide 323, thus transmitting the light 350 between the first photonic integrated circuit 310 and the second photonic integrated circuit 320.

Optically coupling directly between the first waveguide 313 and the second waveguide 323 in the same horizontal plane may be very optically efficient. For example, optical losses may be less than 0.5 dB.

However, as the first waveguide 313 and the second waveguide 323 are in the same horizontal plane, the second photonic integrated circuit 320 protrudes into a cavity 351 defined in the first photonic integrated circuit 310 (or vice versa) in order to align the waveguides 313, 323. While this does transfer an optical signal between adjacent or bonded photonic integrated circuits, it does not change a layer or plane through which the optical signal propagates. Further, there is no footprint reduction of the first waveguide 313 and the second waveguide 323 when taken together, as they are necessarily the same horizontal plane. Since the optical signal does not propagate vertically (e.g., up or down the vertical axis 361 of FIG. 3), an overall footprint of the assembly may not be reduced.

In order to achieve a footprint reduction, one or more mechanisms may be used that couple light between waveguides in two different horizontal planes of an assembly. Such mechanisms may operate as a "photonic via."

An "adiabatic butt coupler" implementation may use an adiabatic taper to gradually expand, in a vertical direction, the optical mode of a waveguide on a first chip. Once the mode is expanded, light may propagate across a small air gap (or filler gap, or the like) to a target waveguide with the same mode profile on another chip. Adiabatic butt couplers exhibit very low optical loss (e.g., little light is scattered or dissipated when coupling between waveguides), good tolerance with respect to misalignment between the chips, and broadband wavelength performance (e.g., a relatively large set of wavelengths of light may couple between waveguides). Further, certain embodiments may coat an edge of either or both waveguides with an anti-reflection coating to reduce back-reflection of light. Similarly, one or both waveguides may have an angled facet to reduce back-reflection.

Figure 4A:
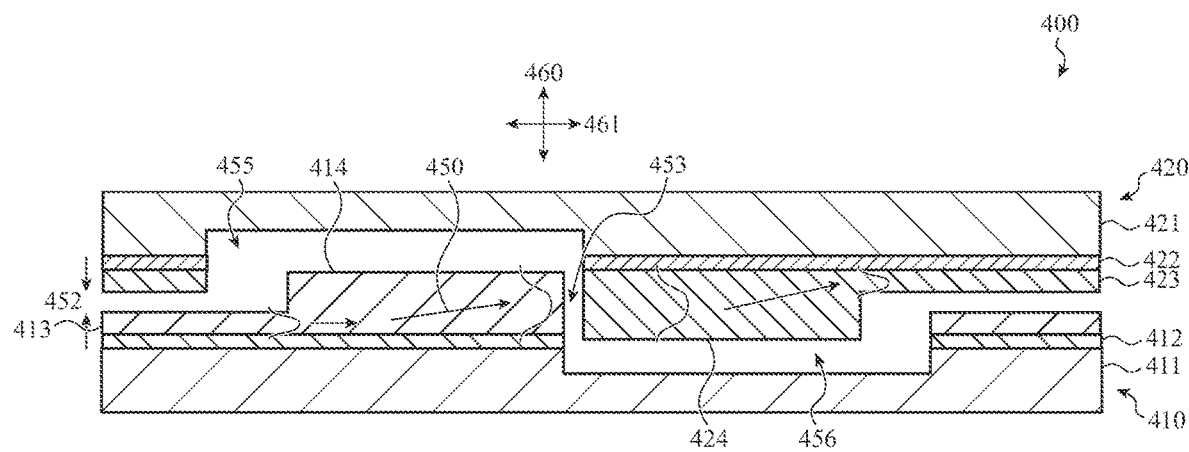
FIG. 4A depicts a side view of a fourth example multi-chip photonic assembly.

As one example of the foregoing, FIG. 4A is a side view of a fourth example multi-chip photonic assembly 400. The multi-chip photonic assembly 400 may implement a photonic via using an adiabatic butt coupler mechanism.

The multi-chip photonic assembly 400 may include a first photonic integrated circuit 410 (or a bottom chip) coupled to a second photonic integrated circuit 420 (or a top chip), stacked vertically (with respect to a vertical axis 460) in a flip chip arrangement. The first photonic integrated circuit 410 may include a first substrate 411 (such as silicon), a first buried oxide layer 412, and a first waveguide 413 (such as a silicon waveguide). Similarly, the second photonic integrated circuit 420 may include a second substrate 421 (such as silicon), a second buried oxide layer 422, and a second waveguide 423 (such as a silicon waveguide). The first and/or second photonic integrated circuit may optionally include additional low-index cladding layers (not shown) to provide optical confinement, such as depicted in FIG. 4D below. Light 450 (which may include one or more wavelengths, supporting either narrowband or broadband implementations) may be transmitted between the first waveguide 413 and the second waveguide 423, thus transmitting the light 450 between the first photonic integrated circuit 410 and the second photonic integrated circuit 420.

The first waveguide 413 may have a first vertical dimension corresponding to a first region that is smaller in height than a second region 414 that has a second vertical dimension larger than the first dimension. Similarly, the second waveguide 423 may have a third vertical dimension corresponding to a third region that is smaller in height than a fourth region 424 that has a fourth vertical dimension larger than the third dimension. The first region of the first waveguide 413 may occupy a different horizontal plane (with respect to a horizontal axis 461) than the third region of the second waveguide 423. However, the second region 414 of the first waveguide 413 may occupy a same and/or similar horizontal plane as the fourth region 424 of the second waveguide 423 such that the second region 414 and the fourth region 424 have vertical facets that face each other horizontally across a coupling gap 453.

As the light 450 travels from a first side of the first waveguide 413 corresponding to the first region (i.e., along the horizontal axis 461) to a second side of the first waveguide 413 corresponding to the second region 414, the mode of the light 450 may change, expanding corresponding to the larger vertical dimension of the second region 414. The light may then travel from the vertical facet of the second region 414 to the vertical facet of the fourth region 424 across the coupling gap 453. From there, the light 450 may travel from a first side of the second waveguide 423 corresponding to the fourth region 424 to a second side of the second waveguide 423 corresponding to the third region (i.e., along the horizontal axis 461). As the light 450 so travels, the mode of the light 450 may change, shrinking as the larger vertical dimension of the fourth region 424 changes to the smaller vertical dimension of the third region of the second waveguide 423. In this way, the mode of the light 450 may change from the first horizontal plane of the first region of the first waveguide 413 to the second horizontal plane of the third region of the second waveguide 423. In other words, the light 450 travels in the vertical stacking direction (i.e., the vertical axis 460) by virtue of the second region 414 and the fourth region 424.

Figure 4B:
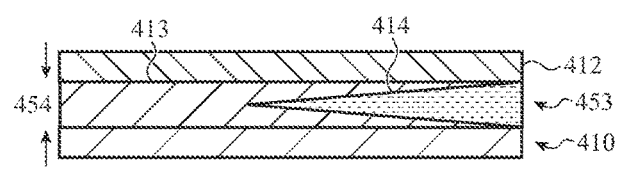
FIG. 4B depicts a top view of the first photonic integrated circuit removed from the multi-chip photonic assembly of FIG. 4A.

FIG. 4B depicts a top view of the first photonic integrated circuit 410 removed from the multi-chip photonic assembly 400 of FIG. 4A. As shown, the first waveguide 413 may have a width 454 and the second region 414 may form an adiabatic taper. The adiabatic taper may taper from the second side of the first waveguide 413 corresponding to the second region 414 towards the first side of the first waveguide 413 corresponding to the first region. In other words, the width of the second region 414 decreases along the horizontal axis 461 from the second side of the first waveguide 413 toward the first side of the first waveguide 413 until the second region 414 terminates. This adiabatic taper may function to expand the mode of the light 450. In this way, the second region 414 may be one of the adiabatic butt couplers mentioned above.

The second region 414 is shown in FIGS. 4A and 4B as having a uniform vertical dimension. However, it is understood that this is an example. In various implementations, the vertical dimension of the second region 414 may slope, curve, step, or otherwise vary from the vertical dimension of the first region of the first waveguide 413 to the maximum vertical dimension of the second region 414. Various configurations are possible and contemplated without departing from the scope of the present disclosure.

Figure 4C:
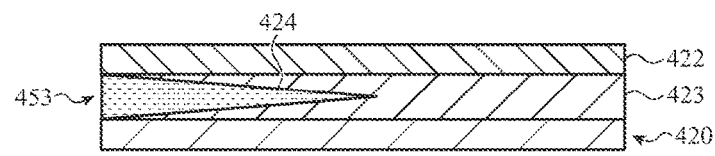
FIG. 4C depicts a bottom view of the second photonic integrated circuit removed from the multi-chip photonic assembly of FIG. 4A with the substrate removed for clarity.
Figure 4D:
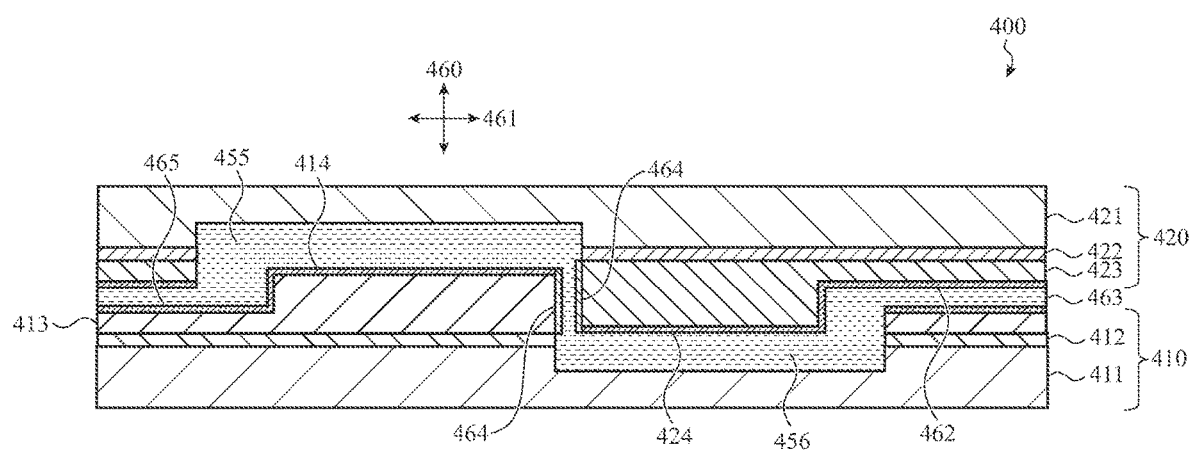
FIG. 4D depicts a side view of an alternative implementation of the multi-chip photonic assembly of FIG. 4A.

FIG. 4C depicts a bottom view of the second photonic integrated circuit 420 removed from the multi-chip photonic assembly 400 of FIG. 4A with the second substrate 421 removed for clarity. As shown, the fourth region 424 may form an adiabatic taper. The adiabatic taper may taper from the second side of the second waveguide 423 corresponding to the fourth region 424 towards the first side of the second waveguide 423 corresponding to the third region. In other words, the width of the fourth region 424 decreases along the horizontal axis 461 from the second side of the second waveguide 423 toward the first side of the second waveguide 413 until the fourth region 424 terminates. This adiabatic taper may function to shrink the mode of the light 450. In this way, the fourth region 424 may be the other of the adiabatic butt couplers mentioned above. The coupling between the photonic circuits can be bidirectional, whereby light introduced into the second waveguide 423 is transferred to the first waveguide 413, in which case the adiabatic taper formed by the fourth region 424 will expand the mode of the light and the adiabatic taper formed by the second region 414 will shrink the mode of the light 450.

The fourth region 424 is shown in FIGS. 4A and 4C as having a uniform vertical dimension. However, it is understood that this is an example. In various implementations, the vertical dimension of the fourth region 424 may slope, curve, step, or otherwise vary from the vertical dimension of the third region of the second waveguide 423 to the maximum vertical dimension of the fourth region 424. Various configurations are possible and contemplated without departing from the scope of the present disclosure.

With reference again to FIG. 4A, the first region of the first waveguide 413 may be separated from the second waveguide 423 by a gap 452 in the vertical direction. This gap 452 in the vertical direction may allow space for one or more layers of cladding materials (as mentioned above, such as oxide), air, one or more coupling structures (not shown) that couple the first photonic integrated circuit 410 to the second photonic integrated circuit 420 (such as one or more adhesives, epoxy or other underfills, pillar and bump configurations where one or more pillars configured on one of the first photonic integrated circuit 410 and the second photonic integrated circuit 420 (such as using one or more of the first waveguide 413 and/or the second waveguide 423 to form such pillars) connect to one or more gold or other solder bumps on the other of the first photonic integrated circuit 410 and second photonic integrated circuit 420 whereupon the solder bumps are reflowed to bond to the pillars, and so on) one or more anti-reflection coatings, and so on. This gap 452 in the vertical direction may also prevent the first region of the first waveguide 413 from contacting the second waveguide 423. While the photonic integrated circuits 410 and 420 are shown in FIG. 4A as coupled in a flip chip arrangement, this does not require electrical connections to be made between the photonic integrated circuits. Electrical connections may be made between the photonic integrated circuits if desired (e.g., to allow electrical signal transmission between the photonic integrated circuits).

The second vertical dimension of the second region 414 and the fourth vertical dimension of the fourth region 424 may have a minimum height. This may be represented by the equation $h_{min}=2h_{strip}+$vertical gap where $h_{min}$ represents the minimum height of the second region 414 or the fourth region 424, $2h_{strip}$ represents twice the height of the other portion of the respective waveguide (i.e., the first region of the first waveguide 413 for the second region 414 and the third region of the second waveguide 423 for the fourth region 424), and "vertical gap" represents the gap 452. For example, an 8 micron height for the second vertical dimension of the second region 414 and the fourth vertical dimension of the fourth region 424 may allow for a 3 micron height for the first region of the first waveguide 413 and the third region of the second waveguide 423 and a 2 micron height for the gap 452 in the vertical direction (which may allow space for oxide and/or other cladding and/or other materials).

To accommodate the fourth vertical dimension of the fourth region 424, the first photonic integrated circuit 410 defines a cavity 456 (a "first cavity"). The cavity 456 extends at least partially through the first buried oxide layer 412 of the first photonic integrated circuit 410. In the variation shown in FIG. 4A, the cavity 456 extends fully through the first buried oxide layer 412 and at least partially through the first substrate 411. When the first photonic integrated circuit 410 and the second photonic integrated circuit 420 are vertically stacked as shown in FIG. 4A, the fourth region 424 of the second waveguide 423 extends at least partially into the cavity 456 of the first photonic integrated circuit 410. This allows a portion of the fourth region 424 of the second waveguide 423 to occupy the same horizontal plane (with respect to horizontal axis 461) as a portion of the first region of the first waveguide 413.

Similarly, to accommodate the second vertical dimension of the second region 414, the second photonic integrated circuit 420 defines a cavity 455 (a "second cavity"). The cavity 455 extends at least partially through the second buried oxide layer 422 of the second photonic integrated circuit 420. In the variation shown in FIG. 4A, the cavity 455 extends fully through the second buried oxide layer 422 and at least partially through the second substrate 421. When the first photonic integrated circuit 410 and the second photonic integrated circuit 420 are vertically stacked as shown in FIG. 4A, the second region 414 of the first waveguide 413 extends at least partially into the cavity 455 of the second photonic integrated circuit 420. This allows a portion of the second region 414 of the first waveguide 413 to occupy the same horizontal plane (with respect to horizontal axis 461) as a portion of the third region of the second waveguide 423.

The first photonic integrated circuit 410 and the second photonic integrated circuit 420 may each be fabricated by epitaxial growth and subsequent etching. For example, a wafer may have a silicon substrate covered by a buried oxide layer, which is itself covered by a silicon layer (e.g., a 3-micron silicon layer). Silicon may be added by epitaxial growth prior to subsequent etching. Etching may be used to define the waveguides (e.g., first waveguide 413 and second waveguide 423) and cavities (e.g., cavities 455 and 456) of the multi-chip photonic assembly 400, such as described below with respect to FIGS. 7A-7E. Various configurations are possible and contemplated without departing from the scope of the present disclosure.

This adiabatic butt coupler implementation illustrated and described above may use adiabatic transfer to expand and/or shrink the optical mode of the light 450 vertically. This implementation may provide a large first waveguide 413 and second waveguide 423 cross-section at the coupling gap 453, which may provide good tolerance for misalignment.

Although the above discusses tolerance for misalignment, it is understood that this is an example. Misalignment may result in lossier light 450 transfer, causing parasitic and/or other light 450 modes that may be sources of noise. However, in some implementations, some such misalignment may be acceptable and/or otherwise accounted for. Various configurations are possible and contemplated without departing from the scope of the present disclosure.

This adiabatic butt coupler implementation illustrated and described above may have low coupling loss (such as at least less than 1 dB). This adiabatic taper may allow for very broadband performance. The large first waveguide 413 and second waveguide 423 may provide good tolerance for misalignment. However, the tapers may be fairly long, such as approximately 700 micrometers or more on each side of the coupling gap 453. Further, new silicon growth and etch may result in challenging fabrication.

FIG. 4D depicts a side view of an alternative implementation of the multi-chip photonic assembly 400 of FIG. 4A. In this alternative implementation, one or more first cladding material layers 465 (e.g., a material having a lower refractive index than the first waveguide 413, such as an oxide) are positioned on the first waveguide 413 facing the second waveguide 423 and one or more second cladding material layers 462 (e.g., a material having a lower refractive index than the first waveguide 413, such as an oxide) are positioned on the second waveguide 423 facing the first waveguide 413. These cladding layers may provide optical confinement to the first waveguide 413 and the second waveguide 423. The space between the first cladding material layer 465 and the second cladding material layer 462 may be filled by an underfill 463, such as an optically clear epoxy. The underfill 463 may mechanically couple the first photonic integrated circuit 410 and the second photonic integrated circuit 420.

Additionally or alternatively, the second region 414 and the fourth region 424 have laterally angled facets that face each other (e.g., are non-perpendicular as they extend from a first side surface to another side surface, or in and out of the page as shown in FIG. 4D), as well as one or more anti-reflective coatings 464 disposed upon those angled facets. It should be appreciated that vertically angled facets may be used in lieu of laterally angled facets (e.g., such facets are non-perpendicular as they extend from a base to a top surface, or from the top to the bottom of the page in FIG. 4D).

In some implementations, the first cladding material layers 465 may be applied to the entire surface of the first waveguide 413 and then portions may be selectively removed (such as any area where the light 450 is to pass, including along the vertical facet of the second region 414). In other implementations, the first cladding material layers 465 may be selectively applied to the portions of the surface of the first waveguide 413, such as using one or more masks, such that areas from which light is to exit the waveguide are not covered.

Similarly, in some implementations, the second cladding material layers 462 may be applied to the entire surface of the second waveguide 423 and then portions may be selectively removed (such as any area where the light 450 is to pass, including along the vertical facet of the fourth region 424). In other implementations, the second cladding material layers 462 may be selectively applied to the portions of the surface of the second waveguide 423, such as using one or more masks, such that areas from which light is to exit the waveguide are not covered.

Although the multi-chip photonic assembly 400 is illustrated and described as including particular components arranged in a particular manner with respect to FIGS. 4A-4C and/or 4D, it is understood that this is an example. In various implementations, other configurations are possible and contemplated without departing from the scope of the present disclosure.

By way of example, the multi-chip photonic assembly 400 is illustrated and described as coupling the first photonic integrated circuit 410 to the second photonic integrated circuit 420. However, in various implementations, any number of photonic integrated circuits may be coupled together, such as three, ten, and so on. Various configurations are possible and contemplated without departing from the scope of the present disclosure. Additionally, each photonic integrated circuit (of multi-chip photonic assembly 400 as well as the other multi-chip photonic assemblies described herein) may include additional photonics components (e.g., splitters, multiplexers, outcouplers, additional waveguides) that are not shown here.

By way of another example, the light 450 is illustrated and described as travelling from the first photonic integrated circuit 410 to the second photonic integrated circuit 420. However, it is understood that this is an example. In various examples, the light 450 may travel from the second photonic integrated circuit 420 to the first photonic integrated circuit 410. In still other examples, the light 450 may travel from the first photonic integrated circuit 410 to the second photonic integrated circuit 420 at some times and/or at some locations and from the second photonic integrated circuit 420 to the first photonic integrated circuit 410 at other times and/or other locations. Various configurations are possible and contemplated without departing from the scope of the present disclosure.

In yet another example, the adiabatic taper of the second region 414 and the adiabatic taper of the fourth region 424 are illustrated as being the same length. However, it is understood that this is an example. In various implementations, the adiabatic taper of the second region 414 and the adiabatic taper of the fourth region 424 may have different lengths. Lengths of the adiabatic taper of the second region 414 and the adiabatic taper of the fourth region 424 may be wavelength and/or geometry dependent. Various configurations are possible and contemplated without departing from the scope of the present disclosure.

In various implementations, a multi-chip photonic assembly may include a first photonic integrated circuit including a first waveguide having a first region that occupies a first horizontal plane and has a first vertical dimension and a second region that has a second vertical dimension that is larger than the first vertical dimension, the second region including a first adiabatic taper. The multi-chip photonic assembly may also include a second photonic integrated circuit, including a second waveguide, stacked vertically over the first photonic integrated circuit, the second waveguide having a third region that occupies a second horizontal plane and has a third vertical dimension and a fourth region that has a fourth vertical dimension that is larger than the third vertical dimension, the fourth region including a second adiabatic taper. The second region may be positioned in the second horizontal plane. The second region and the fourth region may change a mode of light travelling between the first photonic integrated circuit and the second photonic integrated circuit.

In some examples, the second region may overlap the fourth region in the first horizontal plane and the second horizontal plane. In various such examples, the multi-chip photonic assembly may further include an anti-reflection coating positioned between the second region and the fourth region. In some such examples, the first adiabatic taper may taper horizontally from a first side of the second region that faces the fourth region to a second side of the second region that is opposite the first side. In a number of such examples, the first adiabatic taper may taper vertically from a first side of the second region that faces the fourth region to a second side of the second region that is opposite the first side. In some such examples, the second region and the fourth region may cooperate to define a gap between the second region and the fourth region and the gap may be filled with at least one of air or an optically clear underfill.

In a number of examples, the second region may include a first angled facet and the fourth region may include a second angled facet that faces the first angled facet in the first horizontal plane and the second horizontal plane.

An "adiabatic taper transfer" implementation may rely on direct contact between waveguides on two chips to transfer light. As the bottom waveguide is narrowed and the top waveguide is widened, the light may be directly transferred from the bottom waveguide to the top waveguide, without needing to propagate through any air gap. This implementation has the potential for very low loss, extremely broadband wavelength performance, and extremely low back-reflection.

Figure 5A:
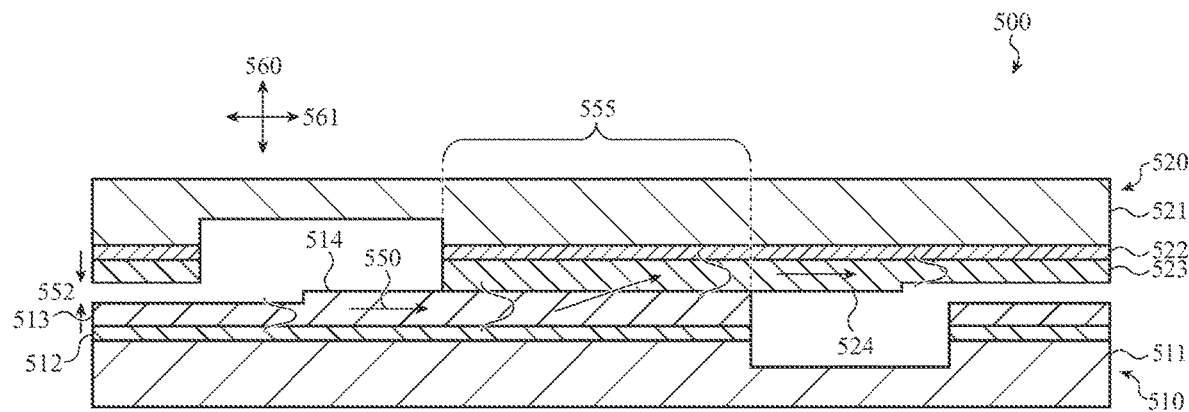
FIG. 5A depicts a side view of a fifth example multi-chip photonic assembly.

For example, FIG. 5A depicts a side view of a fifth example multi-chip photonic assembly 500. The multi-chip photonic assembly 500 may implement a photonic via using an adiabatic taper transfer mechanism.

The multi-chip photonic assembly 500 may include a first photonic integrated circuit 510 (or a bottom chip) coupled to a second photonic integrated circuit 520 (or a top chip) stacked vertically (with respect to a vertical axis 560) in a flip chip arrangement. The first photonic integrated circuit 510 may include a first substrate 511 (such as silicon), a first buried oxide layer 512, and a first waveguide 513 (such as a silicon waveguide). Similarly, the second photonic integrated circuit 520 may include a second substrate 521 (such as silicon), a second buried oxide layer 522, and a second waveguide 523 (such as a silicon waveguide). Light 550 (which may include one or more wavelengths, supporting either narrowband or broadband implementations) may be transmitted between the first waveguide 513 and the second waveguide 523, thus transmitting the light 550 between the first photonic integrated circuit 510 and the second photonic integrated circuit 520.

The first waveguide 513 may have a first vertical dimension corresponding to a first region that is smaller in height than a second region 514 that has a second vertical dimension larger than the first dimension. Similarly, the second waveguide 523 may have a third vertical dimension corresponding to a third region that is smaller in height than a fourth region 524 that has a fourth vertical dimension larger than the third dimension. The first waveguide 513 may occupy a different horizontal plane (with respect to a horizontal axis 561) than the second waveguide 523. However, a portion of the second region 514 of the first waveguide 513 may vertically contact a portion of the fourth region 524 of the second waveguide 523 in an adiabatic transfer region 555. The portion of the second region 514 of the first waveguide 513 may still vertically contact the portion of the fourth region 524 of the second waveguide 523 in the adiabatic transfer region 555 if one or more optically clear adhesives and/or other optically clear materials are positioned therebetween.

Figure 5B:
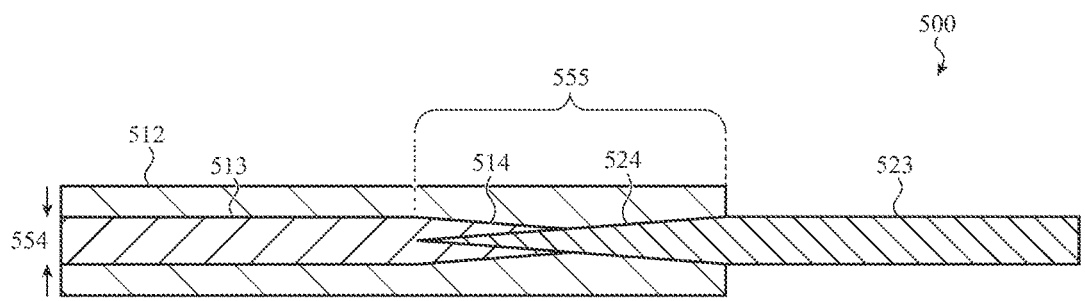
FIG. 5B depicts a top view of the multi-chip photonic assembly of FIG. 5A with the substrate and the buried oxide of the second integrated circuit removed for clarity.

FIG. 5B depicts a top view of the multi-chip photonic assembly 500 of FIG. 5A with the second substrate 521 and the second buried oxide layer 522 of the second integrated circuit 520 removed for clarity. As shown, the first region of the first waveguide 513 may have a width 554 and the second region 514 and the fourth region 524 may each form an adiabatic taper. The adiabatic taper of the second region 514 may taper from the first side of the first waveguide 513 corresponding to the first region towards the second side of the first waveguide 513 corresponding to the second region 514. Similarly, the adiabatic taper of the fourth region 524 may taper from the first side of the second waveguide 523 corresponding to the third region towards the second side of the second waveguide 523 corresponding to the fourth region 524. These adiabatic tapers may function to respectively expand and contract the mode of the light 550.

With respect to FIGS. 5A and 5B, as the light 550 travels from a first side of the first waveguide 513 corresponding to the first region to a second side of the first waveguide 513 corresponding to the second region 514, the mode of the light 550 may change, expanding corresponding to the larger vertical dimension of the second region 514. As the second region 514 narrows and the fourth region 524 widens, the light 550 may be directly transferred from the first waveguide 513 to the second waveguide 523 without the need to propagate through any air gap (which may have very low loss, have extremely broadband wavelength performance, and have extremely low back-reflection). From there, the light 550 may travel from a first side of the second waveguide 523 corresponding to the fourth region 524 to a second side of the second waveguide 523 corresponding to the third region. As the light 550 so travels, the mode of the light 550 may change, shrinking as the larger vertical dimension of the fourth region 524 changes to the smaller vertical dimension of the third region of the second waveguide 523. In this way, the mode of the light 550 may change from the first horizontal plane of the first region of the first waveguide 513 to the second horizontal plane of the third region of the second waveguide 523.

The second region 514 is shown in FIGS. 5A and 5B as having a uniform vertical dimension. However, it is understood that this is an example. In various implementations, the vertical dimension of the second region 514 may slope, curve, step, or otherwise vary from the vertical dimension of the first region of the first waveguide 513 to the maximum vertical dimension of the second region 514. Various configurations are possible and contemplated without departing from the scope of the present disclosure.

The fourth region 524 is shown in FIGS. 5A and 5B as having a uniform vertical dimension. However, it is understood that this is an example. In various implementations, the vertical dimension of the fourth region 524 may slope, curve, step, or otherwise vary from the vertical dimension of the third region of the second waveguide 523 to the maximum vertical dimension of the fourth region 524. Various configurations are possible and contemplated without departing from the scope of the present disclosure.

With reference again to FIG. 5A, the first region of the first waveguide 513 may be separated from the second waveguide 523 by a gap 552 in the vertical direction. This gap 552 in the vertical direction may allow space for one or more layers of cladding materials (such as oxide), air, one or more coupling structures (not shown) that couple the first photonic integrated circuit 510 to the second photonic integrated circuit 520 (such as one or more adhesives, epoxy or other underfills, pillar and bump configurations where one or more pillars configured on one of the first photonic integrated circuit 510 and the second photonic integrated circuit 520 (such as using one or more of the first waveguide 513 and/or the second waveguide 523 to form such pillars) connect to one or more gold or other solder bumps on the other of the first photonic integrated circuit 510 and second photonic integrated circuit 520 whereupon the solder bumps are reflowed to bond to the pillars, and so on) one or more anti-reflection coatings, and so on. This gap 552 in the vertical direction may also prevent the first region of the first waveguide 513 from contacting the second waveguide 523.

The second vertical dimension of the second region 514 and the fourth vertical dimension of the fourth region 524 may have a minimum height. This may be represented by the equation $h_{min}=s_{trip}+$vertical gap/2 where $h_{min}$ represents the minimum height of the second region 514 or the fourth region 524, $h_{strip}$ represents the height of the other portion of the respective waveguide (i.e., the first region of the first waveguide 513 for the second region 514 and the third region of the second waveguide 523 for the fourth region 524), and vertical gap/2 represents half of the gap 552 in the vertical direction. For example, a 4 micron height for the second vertical dimension of the second region 514 and the fourth vertical dimension of the fourth region 524 may allow for a 3 micron height for the first region of the first waveguide 513 and the third region of the second waveguide 523 and a 2 micron height for the gap 552 in the vertical direction (which may allow space for oxide cladding and/or other materials).

The first photonic integrated circuit 510 and the second photonic integrated circuit 520 may be fabricated by epitaxial growth and subsequent etching. For example, a wafer may have a silicon substrate covered by a buried oxide layer, which is itself covered by a 3-micron silicon layer. 1 micron of silicon may be added by epitaxial growth prior to subsequent etching. Various configurations are possible and contemplated without departing from the scope of the present disclosure.

This adiabatic taper transfer implementation illustrated and described above may have low coupling loss (such as less than 1 dB), allow for very broadband performance, and require relatively little epitaxial growth (such as epitaxial silicon growth) (such as 1 micron epitaxial growth compared to the 5 micron epitaxial growth for the adiabatic butt coupler implementation illustrated and discussed above). However, performance may be sensitive to the presence of any vertical gap between the second region 514 and the fourth region 524. For example, a 100-nanometer oxide gap may decrease transmission to less than 10 percent. Further, this adiabatic taper transfer implementation may require fairly long adiabatic tapers, such as over 1000 micrometers.

Although the multi-chip photonic assembly 500 is illustrated and described as including particular components arranged in a particular manner with respect to FIGS. 5A-5B, it is understood that this is an example. In various implementations, other configurations are possible and contemplated without departing from the scope of the present disclosure.

By way of example, the multi-chip photonic assembly 500 is illustrated and described as coupling the first photonic integrated circuit 510 to the second photonic integrated circuit 520. However, in various implementations, any number of photonic integrated circuits may be coupled together, such as three, ten, and so on. Various configurations are possible and contemplated without departing from the scope of the present disclosure.

By way of another example, the light 550 is illustrated and described as travelling from the first photonic integrated circuit 510 to the second photonic integrated circuit 520. However, it is understood that this is an example. In various examples, the light 550 may travel from the second photonic integrated circuit 520 to the first photonic integrated circuit 510. In still other examples, the light 550 may travel from the first photonic integrated circuit 510 to the second photonic integrated circuit 520 at some times and/or at some locations and from the second photonic integrated circuit 520 to the first photonic integrated circuit 510 at other times and/or other locations. Various configurations are possible and contemplated without departing from the scope of the present disclosure.

In yet another example, the adiabatic taper of the second region 514 and the adiabatic taper of the fourth region 524 are illustrated as being the same length. However, it is understood that this is an example. In various implementations, the adiabatic taper of the second region 514 and the adiabatic taper of the fourth region 524 may have different lengths. Lengths of the adiabatic taper of the second region 514 and the adiabatic taper of the fourth region 524 may be wavelength and/or geometry dependent. Various configurations are possible and contemplated without departing from the scope of the present disclosure.

In some implementations, a multi-chip photonic assembly may include a first photonic integrated circuit including a first waveguide having a first region that occupies a first horizontal plane and has a first vertical dimension and a second region that has a second vertical dimension that is larger than the first vertical dimension, the second region having a first adiabatic taper. The multi-chip photonic assembly may also include a second photonic integrated circuit, including a second waveguide, stacked vertically over the first photonic integrated circuit, the second waveguide having a third region that occupies a second horizontal plane and has a third vertical dimension and a fourth region that has a fourth vertical dimension that is larger than the third vertical dimension, the fourth region including a second adiabatic taper. The second region may vertically contact the second waveguide. The second region and the fourth region may change a mode of light travelling between the first photonic integrated circuit and the second photonic integrated circuit.

In various examples, the second region may vertically contact the second waveguide via an optically clear adhesive. In some examples, the multi-chip photonic assembly may further include an adiabatic transfer region where the second adiabatic taper vertically overlaps the first adiabatic taper. In various such examples, the light may travel between the first waveguide and the second waveguide where the second region vertically contacts the second waveguide.

In some examples, the multi-chip photonic assembly may further include cladding material positioned between the first waveguide and the second waveguide. In a number of examples, the first adiabatic taper may taper opposite the second adiabatic taper. In some examples, the second region may be positioned proximate the fourth region and opposite the third region.

A vertical multi-mode interference coupler implementation may rely on interference between optical modes to transfer light. The input optical mode on a bottom plane may be imaged to the mirror location on a top plane after propagating a certain distance, and then the light may propagate across a small air gap to reach the target waveguide on the other chip. This implementation has a potential for very low loss and good tolerance to misalignment between the chips. Back-reflections at the gap can be minimized using anti-reflection coatings and angled facets.

Figure 6A:
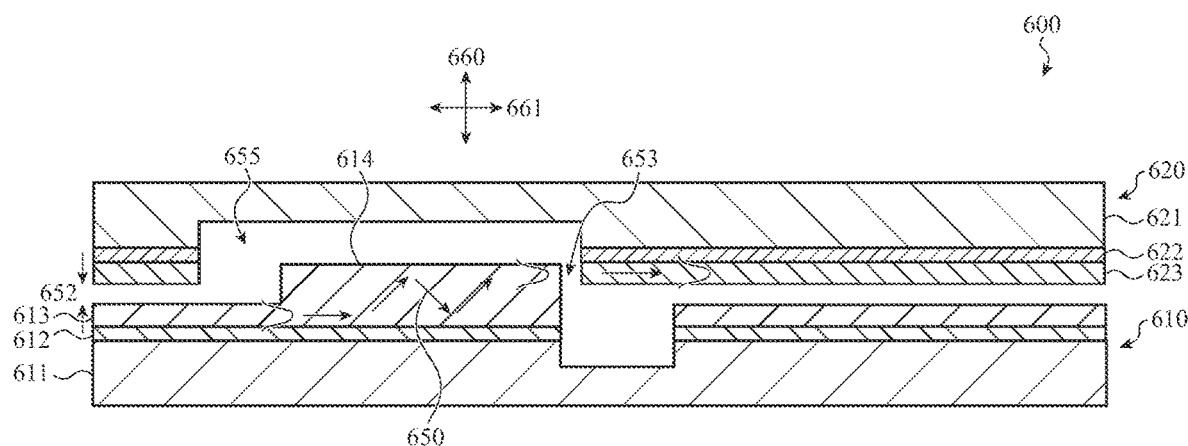
FIG. 6A depicts a side view of a sixth example multi-chip photonic assembly.

For example, FIG. 6A depicts a side view of a sixth example multi-chip photonic assembly 600. The multi-chip photonic assembly 600 may implement a photonic via using a vertical multi-mode interference coupler mechanism.

The multi-chip photonic assembly 600 may include a first photonic integrated circuit 610 (or a bottom chip) coupled to a second photonic integrated circuit 620 (or a top chip) stacked vertically (with respect to a vertical axis 660) in a flip chip arrangement. The first photonic integrated circuit 610 may include a first substrate 611 (such as silicon), a first buried oxide layer 612, and a first waveguide 613 (such as a silicon waveguide). Similarly, the second photonic integrated circuit 620 may include a second substrate 621 (such as silicon), a first buried oxide layer 622, and a second waveguide 623 (such as a silicon waveguide). Light 650 (which may include one or more wavelengths) may be transmitted between the first waveguide 613 and the second waveguide 623, thus transmitting the light 650 between the first photonic integrated circuit 610 and the second photonic integrated circuit 620.

The first waveguide 613 may have a first vertical dimension corresponding to a first region that is smaller in height than a second region 614 that has a second vertical dimension larger than the first dimension. The second waveguide 623 may have a third vertical dimension. The first region of the first waveguide 613 may occupy a different horizontal plane (with respect to a horizontal axis 661) than the second waveguide 623. However, the second region 614 of the first waveguide 613 may occupy a same and/or similar horizontal plane as the second waveguide 623 such that the second region 614 and the second waveguide 623 have vertical facets that face each other horizontally across a coupling gap 653.

As the light 650 travels from a first side of the first waveguide 613 corresponding to the first region to a second side of the first waveguide 613 corresponding to the second region 614, the height change in the first waveguide 613 from the first region to the second region 614 will split the light into multiple optical modes. The second region 614 is sized such that interference between the optical modes may cause input optical mode on a bottom plane of the second region 614 to be imaged to the mirror location on a top plane of the second region 614 after propagating a certain distance through the second region 614. The light 650 may then propagate across a coupling gap 653 to reach the second waveguide 623. From there, the light 650 may travel from a first side of the second waveguide 623 proximate the coupling gap 653 to a second side of the second waveguide 623 opposite the first side. In this way, the mode of the light 650 may change from the first horizontal plane of the first region of the first waveguide 613 to the second horizontal plane of the second waveguide 623.

Figure 6B:
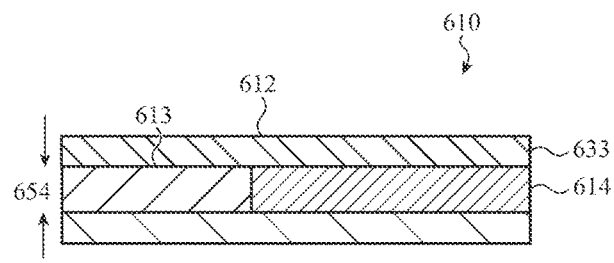
FIG. 6B depicts a top view of the first photonic integrated circuit removed from the multi-chip photonic assembly of FIG. 6A.

FIG. 6B depicts a top view of the first photonic integrated circuit 610 removed from the multi-chip photonic assembly 600 of FIG. 6A. As shown, the first waveguide 613 may have a width 654, which may be measured in single-digit micrometers. As also shown, with reference to FIGS. 6A and 6B, the second region 614 may have a uniform horizontal dimension extending from a first side of the second region 614 (that faces the second waveguide 623) to a second side of the second region 614 that is opposite the first side.

The second region 614 is shown in FIGS. 6A and 6B as having a uniform vertical dimension. However, it is understood that this is an example. In various implementations, the vertical dimension of the second region 614 may slope, curve, step, or otherwise vary from the vertical dimension of the first region of the first waveguide 613 to the maximum vertical dimension of the second region 614. Various configurations are possible and contemplated without departing from the scope of the present disclosure.

Figure 6C:
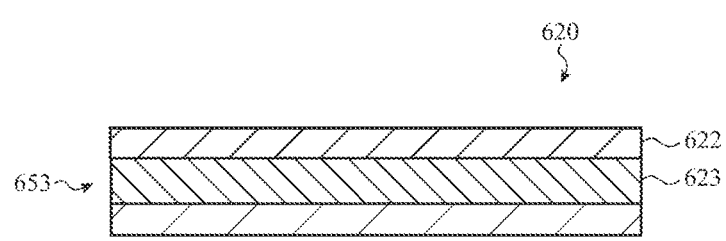
FIG. 6C depicts a bottom view of the second photonic integrated circuit removed from the multi-chip photonic assembly of FIG. 6A with the substrate removed for clarity.

FIG. 6C depicts a bottom view of the second photonic integrated circuit 620 removed from the multi-chip photonic assembly 600 of FIG. 4A with the second substrate 621 removed for clarity.

With reference again to FIG. 6A, the first region of the first waveguide 613 may be separated from the second waveguide 623 by a gap 652 in the vertical direction. This gap 652 in the vertical direction may allow space for one or more layers of cladding materials (e.g., a material having a lower refractive index than the waveguides, such as an oxide), air, one or more coupling structures (not shown) that couple the first photonic integrated circuit 610 to the second photonic integrated circuit 620 (such as one or more adhesives, epoxy or other underfills, pillar and bump configurations where one or more pillars configured on one of the first photonic integrated circuit 610 and the second photonic integrated circuit 620 (such as using one or more of the first waveguide 613 and/or the second waveguide 623 to form such pillars) connect to one or more gold or other solder bumps on the other of the first photonic integrated circuit 610 and second photonic integrated circuit 620 whereupon the solder bumps are reflowed to bond to the pillars, and so on) one or more anti-reflection coatings, and so on. This gap 652 in the vertical direction may also prevent the first region of the first waveguide 613 from contacting the second waveguide 623.

The second vertical dimension of the second region 614 may have a minimum height. This may be represented by the equation $h_{min} = 2h_{strip} + \text{vertical gap}$ where $h_{min}$ represents the minimum height of the second region 614, $2h_{strip}$ represents twice the height of the first region of the first waveguide 613, and vertical gap represents the gap 652 in the vertical direction. For example, an 8 micron height for the second vertical dimension of the second region 614 and the fourth vertical dimension of the fourth region 624 may allow for a 3 micron height for the first region of the first waveguide 613 and the second waveguide 623 and a 2 micron height for the gap 652 in the vertical direction (which may allow space for oxide cladding and/or other materials).

To accommodate the second vertical dimension of the second region 614, the second photonic integrated circuit 620 defines a cavity 655. The cavity 655 extends at least partially through the first buried oxide layer 622 of the second photonic integrated circuit 620. In the variation shown in FIG. 6A, the cavity 655 extends fully through the first buried oxide layer 622 and at least partially through the second substrate 621. When the first photonic integrated circuit 610 and the second photonic integrated circuit 620 are vertically stacked as shown in FIG. 6A, the second region 614 of the first waveguide 613 extends at least partially into the cavity 655 of the second photonic integrated circuit 620. This allows a portion of the second region 614 of the first waveguide 613 to occupy the same horizontal plane (with respect to horizontal axis 661) as a portion of the second waveguide 623.

The first photonic integrated circuit 610 may be fabricated by epitaxial growth and subsequent etching. For example, a wafer may have a silicon substrate covered by a buried oxide layer, which is itself covered by a 3-micron silicon layer. Silicon may be added by epitaxial growth prior to subsequent etching. Various configurations are possible and contemplated without departing from the scope of the present disclosure.

This multi-mode interference coupler implementation illustrated and described above may rely on multi-mode interference to move the optical mode of the light 650 to a different plane. Relatively large cross-sections of the first waveguide 613 at the coupling gap 653 may provide good tolerance to misalignment. Peak transmission may be quite high, such as with less than 1 dB loss. However, multi-mode interference may be a narrowband device. Higher bandwidths may increase loss and multi-mode interference may be used pre-multiplexer (and/or a multiplexer may be used to narrow the band prior to the multi-mode interference coupler and a demultiplexer may be used to widen the band after the multi-mode interference coupler). Further, new silicon growth and etch may result in challenging fabrication.

Although the above discusses tolerance for misalignment, it is understood that this is an example. Misalignment may result in lossier light 650 transfer, causing parasitic and/or other light 650 modes that may be sources of noise. However, in some implementations, some such misalignment may be acceptable and/or otherwise accounted for. Various configurations are possible and contemplated without departing from the scope of the present disclosure.

Although the multi-chip photonic assembly 600 is illustrated and described as including particular components arranged in a particular manner with respect to FIGS. 6A-6C, it is understood that this is an example. In various implementations, other configurations are possible and contemplated without departing from the scope of the present disclosure.

By way of example, the multi-chip photonic assembly 600 is illustrated and described as coupling the first photonic integrated circuit 610 to the second photonic integrated circuit 620. However, in various implementations, any number of photonic integrated circuits may be coupled together, such as three, ten, and so on. Various configurations are possible and contemplated without departing from the scope of the present disclosure.

By way of another example, the light 650 is illustrated and described as travelling from the first photonic integrated circuit 610 to the second photonic integrated circuit 620. However, it is understood that this is an example. In various examples, the light 650 may travel from the second photonic integrated circuit 620 to the first photonic integrated circuit 610. In still other examples, the light 650 may travel from the first photonic integrated circuit 610 to the second photonic integrated circuit 620 at some times and/or at some locations and from the second photonic integrated circuit 620 to the first photonic integrated circuit 610 at other times and/or other locations. Various configurations are possible and contemplated without departing from the scope of the present disclosure.

In a number of implementations, a multi-chip photonic assembly may include a first photonic integrated circuit including a first waveguide having a first region that occupies a first horizontal plane and has a first vertical dimension and a second region that has a second vertical dimension that is larger than the first vertical dimension. The multi-chip photonic assembly may further include a second photonic integrated circuit, including a second waveguide that occupies a second horizontal plane, stacked vertically over the first photonic integrated circuit. The second region may be positioned in the second horizontal plane. The second region may change a mode of light travelling between the first photonic integrated circuit and the second photonic integrated circuit.

In various examples, the second region may use interference between optical modes to transfer the light travelling between the first photonic integrated circuit and the second photonic integrated circuit. In some examples, the second region may have a uniform horizontal dimension from a first side of the second region that faces the second waveguide to a second side of the second region that is opposite the first side. In a number of examples, the second vertical dimension may be uniform from a first side of the second region that faces the second waveguide to a second side of the second region that is opposite the first side. In various examples, the first waveguide may define a gap horizontally between the second region and the second waveguide. In some examples, the second waveguide may have a third vertical dimension that is smaller than the second vertical dimension.

Figure 7A:
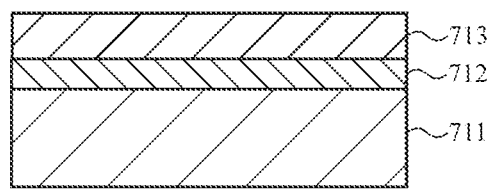
FIG. 7A depicts an example wafer for a photonic integrated circuit. The wafer may be used to make one or more of the first photonic integrated circuits and/or the second photonic integrated circuits of FIGS. 1-6C and FIGS. 8A-8C.

FIGS. 7A-7E illustrate fabrication of a photonic integrated circuit. FIG. 7A depicts an example wafer for a photonic integrated circuit. The wafer may be used to make one or more of the first photonic integrated circuits 410, 510, 610, 802 and/or the second photonic integrated circuits 420, 520, 620, 804 of FIGS. 1-6C and 8A-8C. The wafer may include a substrate 711 (such as a silicon substrate), a buried oxide layer 712, and a layer 713 (such as a silicon layer). For example, the buried oxide layer 712 may be one micrometer in height and the layer 713 may be a three micrometer layer of silicon, although these are example measurements and provided by way of illustration. Actual measurements may vary in different embodiments.

Figure 7B:
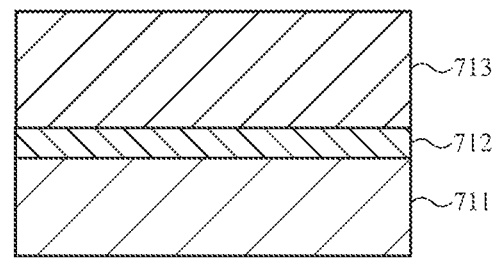
FIG. 7B depicts the example wafer of FIG. 7A after performance of an epitaxial growth operation.

FIG. 7B depicts the example wafer of FIG. 7A after performance of an epitaxial growth operation. This may result in epitaxial growth of the layer 713, thereby providing a thicker layer for processing and feature formation.

Figure 7C:
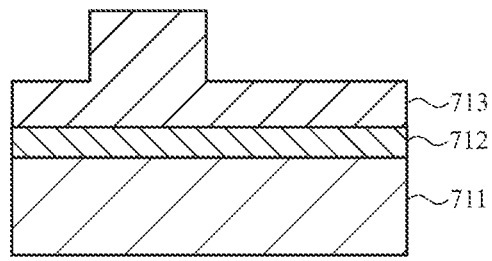
FIG. 7C depicts the wafer of FIG. 7B after performance of a first etching operation.

FIG. 7C depicts the wafer of FIG. 7B after performance of a first etching operation. The first etching operation may remove portions of the layer 713 in order to leave a portion of the layer 713 proud of the rest of the surface.

Figure 7D:
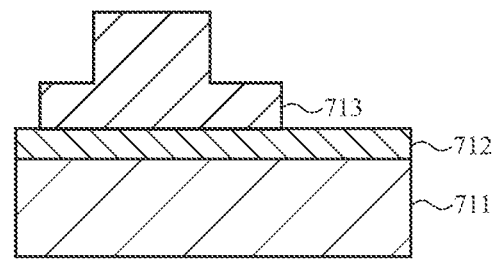
FIG. 7D depicts the wafer of FIG. 7C after performance of a second etching operation.

FIG. 7D depicts the wafer of FIG. 7C after performance of a second etching operation. This second etching operation may remove entire areas of the layer 713, exposing one or more portions of the buried oxide layer 712.

Figure 7E:
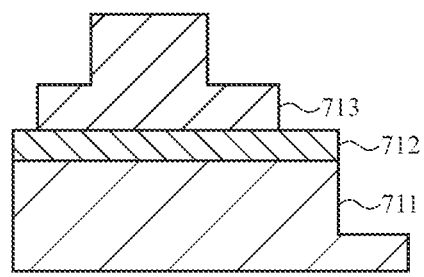
FIG. 7E depicts the wafer of FIG. 7D after performance of a deep cavity etching operation.

FIG. 7E depicts the wafer of FIG. 7D after performance of a deep cavity etching operation. This deep cavity etching operation may remove entire areas of the buried oxide layer 712 and/or portions of the substrate 711.

One or more additional operations may be performed subsequent to FIG. 7E. Such additional operations may include one or more backend processing steps, flip chip bonding, and so on. Various configurations are possible and contemplated without departing from the scope of the present disclosure.

Figure 8A:
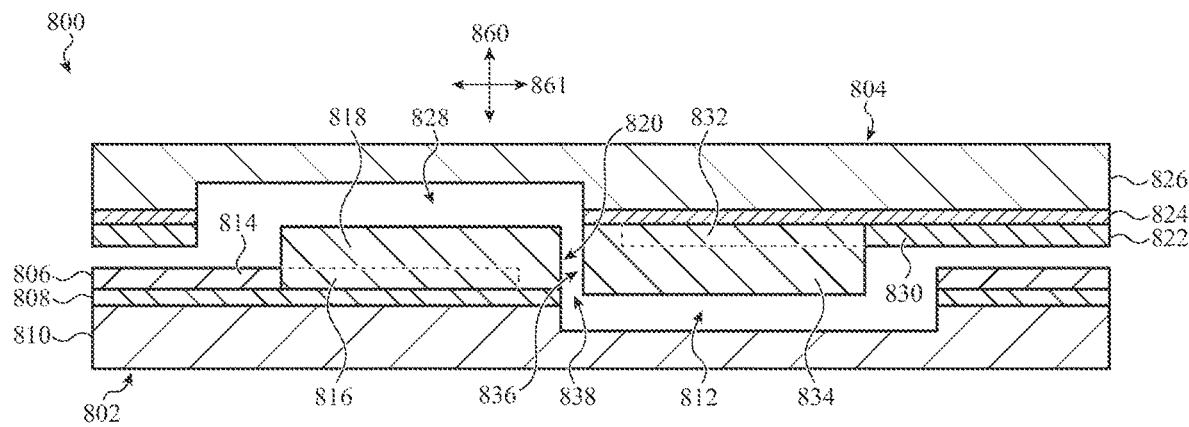
FIG. 8A depicts a side view of a seventh example multi-chip photonic assembly.

FIG. 8A shows a side view of a sixth example multi-chip photonic assembly 800. Similar to the multi-chip photonic assembly 400 described above with respect to FIGS. 4A-4D, the multi-chip photonic assembly 800 vertically expands the mode of light before it is transferred between photonics integrated circuits. Instead of using a taper (that expands toward a facet of a waveguide) to vertically expand the mode in the multi-chip photonic assembly 400, the multi-chip photonic assembly 800 expands the mode using a waveguide segment made from two different waveguide materials.

The multi-chip photonic assembly 800 may include a first photonic integrated circuit 802 (or a bottom chip) coupled to a second photonic integrated circuit 804 (or a top chip), stacked vertically (with respect to a vertical axis 860) in a flip chip arrangement. The first photonic integrated circuit 802 may include a first substrate 810 (such as silicon), a first waveguide 806, and a first buried oxide layer 808 between the first substrate 810 and the first waveguide 806. Similarly, the second photonic integrated circuit 804 may include a second substrate 826 (such as silicon) a second waveguide 822, and a second buried oxide layer 824 between the second substrate 826 and the second waveguide 822. The first and/or second photonic integrated circuit may optionally include additional low-index cladding layers (not shown) that have a lower refractive index than the materials of the first and second waveguides, which thereby provide optical confinement as discussed above. Light 850 (which is depicted in FIGS. 8B and 8C and may include one or more wavelengths, supporting either narrowband or broadband implementations) may be transmitted between the first waveguide 806 and the second waveguide 822, thus transmitting the light 850 between the first photonic integrated circuit 802 and the second photonic integrated circuit 804.

Figure 8B:
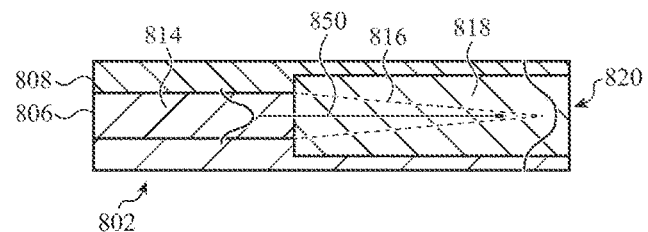
FIG. 8B depicts a top view of the multi-chip photonic assembly of FIG. 8A, with the second photonic chip removed for clarity.

FIG. 8B depicts a top view of the first photonic integrated circuit 802 removed from the multi-chip photonic assembly 800 of FIG. 8A. The first waveguide 806 is formed from a first waveguide material (e.g., silicon) that is partially overlaid by a second waveguide material (e.g., silicon mononitride, a polymer, or the like) having a lower refractive index than the first waveguide material. As shown in FIGS. 8A and 8B, the first waveguide 806 comprises a first region connected to a second region (i.e., a distal end of the first region is coupled to a proximal end of the second region). The first region is formed from a first segment 814 of the first waveguide material (also referred to as "first segment 814") and the second region is formed from a second segment 816 of the first waveguide material (also referred to as "second segment 816") and a segment 818 of the second waveguide material (also referred to as "fifth segment 818") that covers the second segment 816. The first segment 814 and the second segment 816 may be formed as a monolithic component, and in these instances interface between the first region and second region is defined by the addition of the segment 818 of the second waveguide material to the second region. The fifth segment 818 is taller than the second segment 816 and is at least as wide, such that the exterior dimensions of the fifth segment 818 define the exterior dimensions of the second region.

The first region has a vertical dimension (a "first vertical dimension") that is smaller in height than a vertical dimension of the second region (a "second vertical dimension"). In some instances, the second region has a width that is greater the first region. These dimensions may also determine the dimensions of a vertical facet 820 at a distal end of the first waveguide 806. The first segment 814 has a width (a "first width") where the first region meets the second region (i.e., at a distal end of the first region). The second segment 816 tapers adiabatically in the second region, such that the width of the second segment 816 narrows from the first width (in a direction from a proximal end of the second region toward the distal end/vertical facet of the second region). In some instances, the second segment 816 terminates prior to the distal end of the second region. In these instances, the vertical facet 820 at the distal end of the second region is formed entirely from the segment 818 of the second waveguide material.

Figure 8C:
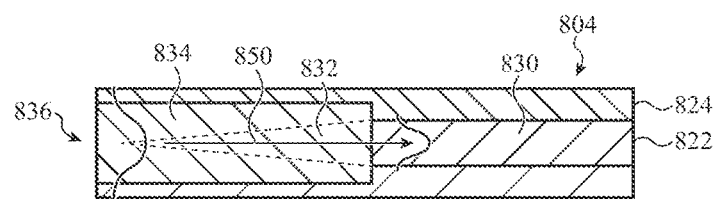
FIG. 8C depicts a bottom view of the multi-chip photonic assembly of FIG. 8A, with the first photonic chip removed for clarity.

FIG. 8C depicts a top view of the second photonic integrated circuit 804 removed from the multi-chip photonic assembly 800 of FIG. 8A. The second waveguide 822 is formed from a third waveguide material (e.g., silicon) that is partially overlaid by a fourth waveguide material (e.g., silicon mononitride, a polymer, or the like) having a lower refractive index than the third waveguide material. It should be appreciated that the first waveguide material (from the first waveguide 806) may be the same material as or a different material from the third waveguide material (from the second waveguide 822). Similarly, the second waveguide material (from the first waveguide 806) may be the same material as or a different material from the fourth waveguide material (from the second waveguide).

As shown in FIGS. 8A and 8C, the second waveguide 808 comprises a third region connected to a fourth region (i.e., a distal end of the third region is coupled to a proximal end of the fourth region). The third region is formed from a first segment 830 of the third waveguide material (also referred to as "third segment 830") and the fourth region is formed from a second segment 832 of the third waveguide material (also referred to as "fourth segment 832") and a segment 834 of the fourth waveguide material (also referred to as "sixth segment 834") that covers the fourth segment 832. The third segment 830 and the fourth segment 832 may be formed as a monolithic component, and in these instances interface between the third region and fourth region is defined by the addition of the segment 834 of the fourth waveguide material to the fourth region. The sixth segment 834 is taller than the fourth segment 832 and is at least as wide, such that the exterior dimensions of the sixth segment 834 define the exterior dimensions of the fourth region.

The third region has a vertical dimension (a "third vertical dimension") that is smaller in height than a vertical dimension of the fourth region (a "fourth vertical dimension"). In some instances, the fourth region has a width that is greater the third region. These dimensions may also determine the dimensions of a vertical facet 836 at a distal end of the second waveguide 822. The third segment 814 has a width (a "second width", which may be the same as or different from the first width) where the third region meets the fourth region (i.e., at a distal end of the third region). The fourth segment 816 tapers adiabatically in the fourth region, such that the width of the fourth segment 816 narrows from the second width (in a direction from a proximal end of the fourth region toward the distal end/vertical facet of the fourth region). In some instances, the fourth segment 816 terminates prior to the distal end of the fourth region. In these instances, the vertical facet 836 at the distal end of the second region is formed entirely from the segment 818 of the second waveguide material.

When the first photonic integrated circuit 802 and the second photonic integrated circuit 804 are vertically stacked as shown in FIG. 8A, the distal end of the first waveguide 806 faces the distal end of the second waveguide 822. This positions the vertical facet 820 of the first waveguide 806 to face the vertical facet 836 of the second waveguide 822 and are separated horizontally (i.e., along a horizontal axis 861) by a gap 838. In this way, the fifth segment 818 may occupy a common horizontal plane (with respect to horizontal axis 861) as the sixth segment 834. Conversely, the first segment 814 and second segment 816 of the first waveguide material are positioned in a different horizontal plane (with respect to the horizontal axis 861) than the third segment 830 and fourth segment 832 of the third waveguide material.

As light 850 is introduced into the first waveguide 806 (e.g., at a proximal end of the first waveguide), light travels from the first region the second region along the first waveguide material. As the light 850 passes from the first segment 814 to the second segment 816, the narrowing width of the second segment 816 may no longer be able to confine the light 850, resulting in the mode expanding into the second waveguide material (i.e., the fifth segment 818). As the mode expands, the second waveguide material will act to confine the light 850. The light will travel through the second waveguide material in the second region until it reaches the vertical facet 820 of the first waveguide 806.

The light will cross gap 838 from the vertical facet 820 of the first waveguide 806 to the vertical facet 836 of the second waveguide 822. From there, the light 850 is confined by and travels through the fourth waveguide material (i.e., the sixth segment 834) in the fourth region. As the width of the fourth segment 832 increases (i.e., toward the proximal end of the fourth region), the light 850 will begin to couple into and be confined by the third waveguide material (thereby shrinking the mode). As the light 850 reaches the proximal end of the fourth region, the light 850 may be fully confined by the third waveguide material. In other words, the light 850 may enter the second waveguide 822 through the sixth segment 834, couple into the fourth segment 832 of third waveguide material, and then pass into the third segment 830 of third waveguide material. In this way, the light 850 may be transferred from a proximal end of the first waveguide 806 to a proximal end of the second waveguide 822. Similarly, light introduced into proximal end of the second waveguide 822 may be transferred to a proximal end of the first waveguide 806. This results in the light being passed form a first horizontal plane in one photonic integrated circuit to a different horizontal plane in the other photonic integrated circuit.

While the second region of the first waveguide 806 and the fourth region of the second waveguide 822 are shown in FIG. 8A as having a uniform vertical dimension, in some instances the second region and/or fourth regions have a vertical dimension that varies. For example, the height of the fifth segment 818 (and thus the height of the second region) may slope, curve, step, or otherwise vary from the vertical dimension of the first region to the maximum vertical dimension of the second region. Additionally or alternatively, the height of the sixth segment 834 (and thus the height of the fourth region) may slope, curve, step, or otherwise vary from the vertical dimension of the third region to the maximum vertical dimension of the fourth region.

As discussed above with respect to the other multi-chip photonics assemblies, the first photonic integrated circuit 802 may be vertically separated from the second photonic integrated circuit 802 to allow space for one or more layers of cladding materials (as mentioned above, such as oxide), air, one or more coupling structures (such as one or more adhesives, epoxy or other underfills, pillar and bump configurations as discussed above), between the waveguides of the different photonic integrated circuits. While the photonic integrated circuits 802 and 804 are shown in FIG. 8A as coupled in a flip chip arrangement, this does not require electrical connections to be made between the photonic integrated circuits. Electrical connections may be made between the photonic integrated circuits if desired (e.g., to allow electrical signal transmission between the photonic integrated circuits).

To accommodate the fourth vertical dimension of the fourth region of the second waveguide 822, the first photonic integrated circuit 802 defines a cavity 812. The cavity 812 extends at least partially through the first buried oxide layer 808 of the first photonic integrated circuit 802. In the variation shown in FIG. 8A, the cavity 812 extends fully through the first buried oxide layer 808 and at least partially through the first substrate 810. When the first photonic integrated circuit 802 and the second photonic integrated circuit 804 are vertically stacked as shown in FIG. 8A, the fourth region of the second waveguide 822 (specifically the sixth segment 834) extends at least partially into the cavity 812 of the first photonic integrated circuit 802. This allows a portion of the fourth region of the second waveguide 822 to occupy the same horizontal plane (with respect to horizontal axis 861) as a portion of the first region of the first waveguide 806.

Similarly, to accommodate the second vertical dimension of the second region of the first waveguide 806, the second photonic integrated circuit 804 defines a cavity 828. The cavity 828 extends at least partially through the second buried oxide layer 824 of the second photonic integrated circuit 804. In the variation shown in FIG. 8A, the cavity 828 extends fully through the second buried oxide layer 824 and at least partially through the second substrate 826. When the first photonic integrated circuit 802 and the second photonic integrated circuit 804 are vertically stacked as shown in FIG. 8A, the second region of the first waveguide 806 extends at least partially into the cavity 828 of the second photonic integrated circuit 804. This allows a portion of the second region of the first waveguide 806 to occupy the same horizontal plane (with respect to horizontal axis 861) as a portion of the third region of the second waveguide 822. The first photonic integrated circuit 802 and the second photonic integrated circuit 804 may be fabricated such as discussed above (e.g., with epitaxial growth and subsequent etching), with the additional step of depositing and etching the additional waveguide material.

As described above and illustrated in the accompanying figures, the present disclosure relates to multi-chip photonic assemblies. First and second photonic integrated circuits having first and second waveguides may be vertically stacked such that first vertical dimensions of the first and second waveguides occupy different horizontal planes in the stack. At least one of the first and second waveguides has a region that has a second vertical dimension that is larger than the first vertical dimension and either horizontally overlaps the other waveguide and/or vertically contacts the other waveguide. Light moving through one of the waveguides from the first vertical dimension to the other vertical dimension changes modes vertically so that the light moves from one waveguide to the other.

Although the above illustrates and describes a number of embodiments, it is understood that these are examples. In various implementations, various techniques of individual embodiments may be combined without departing from the scope of the present disclosure.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A multi-chip photonic assembly, comprising:
   a first photonic integrated circuit including a first waveguide having:
      a first region that occupies a first horizontal plane and has a first vertical dimension; and
      a second region that has a second vertical dimension that is larger than the first vertical dimension, the second region comprising a first adiabatic taper; and
   a second photonic integrated circuit, including a second waveguide, stacked vertically over the first photonic integrated circuit, the second waveguide having:
      a third region that occupies a second horizontal plane and has a third vertical dimension; and
      a fourth region that has a fourth vertical dimension that is larger than the third vertical dimension, the fourth region comprising a second adiabatic taper; wherein:
      the second region is positioned in the second horizontal plane; and
      the second region and the fourth region change a mode of light travelling between the first photonic integrated circuit and the second photonic integrated circuit; and
      the first adiabatic taper tapers horizontally such that a width of second region decreases from a first side of the second region that faces the fourth region until the second region terminates.

2. The multi-chip photonic assembly of claim 1, wherein the second region overlaps the fourth region in the first horizontal plane and the second horizontal plane.

3. The multi-chip photonic assembly of claim 2, further comprising an anti-reflection coating positioned between the second region and the fourth region.

4. The multi-chip photonic assembly of claim 2, wherein:
   the second region and the fourth region cooperate to define a gap between the second region and the fourth region; and
   the gap is filled with at least one of air or an optically clear underfill.

5. The multi-chip photonic assembly of claim 1, wherein:
   the second region comprises a first angled facet; and
   the fourth region comprises a second angled facet that faces the first angled facet in the first horizontal plane and the second horizontal plane.

6. A multi-chip photonic assembly, comprising:
   a first photonic integrated circuit including a first waveguide having:
      a first region that occupies a first horizontal plane and has a first vertical dimension; and
      a second region that has a second vertical dimension that is larger than the first vertical dimension, the second region comprising a first adiabatic taper; and
   a second photonic integrated circuit, including a second waveguide, stacked vertically over the first photonic integrated circuit, the second waveguide having:
      a third region that occupies a second horizontal plane and has a third vertical dimension; and
      a fourth region that has a fourth vertical dimension that is larger than the third vertical dimension, the fourth region comprising a second adiabatic taper; wherein:
      the second region vertically contacts the second waveguide; and
      the second region and the fourth region change a mode of light travelling between the first photonic integrated circuit and the second photonic integrated circuit.

7. The multi-chip photonic assembly of claim 6, wherein the second region vertically contacts the second waveguide via an optically clear adhesive.

8. The multi-chip photonic assembly of claim 6, further comprising an adiabatic transfer region where the second adiabatic taper vertically overlaps the first adiabatic taper.

9. The multi-chip photonic assembly of claim 6, wherein the light travels between the first waveguide and the second waveguide where the second region vertically contacts the second waveguide.

10. The multi-chip photonic assembly of claim 6, further comprising cladding material positioned between the first waveguide and the second waveguide.

11. The multi-chip photonic assembly of claim 6, wherein the first adiabatic taper tapers opposite the second adiabatic taper.

12. The multi-chip photonic assembly of claim 6, wherein the second region is positioned proximate the fourth region and opposite the third region.

13. A multi-chip photonic assembly, comprising:
    a first photonic integrated circuit including a first waveguide having:
       a first region that occupies a first horizontal plane and has a first vertical dimension; and
       a second region that has a second vertical dimension that is larger than the first vertical dimension; and
    a second photonic integrated circuit, including a second waveguide that occupies a second horizontal plane, stacked vertically over the first photonic integrated circuit; wherein:
       the second region is positioned in the second horizontal plane;
       the second region changes a mode of light travelling between the first photonic integrated circuit and the second photonic integrated circuit; and
       the second region uses interference between optical modes within the second region to transfer the light travelling between the first photonic integrated circuit and the second photonic integrated circuit.

14. The multi-chip photonic assembly of claim 13, wherein the second region has a uniform horizontal dimension from a first side of the second region that faces the second waveguide to a second side of the second region that is opposite the first side.

15. The multi-chip photonic assembly of claim 13, wherein the second vertical dimension is uniform from a first side of the second region that faces the second waveguide to a second side of the second region that is opposite the first side.

16. The multi-chip photonic assembly of claim 13, wherein the first waveguide defines a gap horizontally between the second region and the second waveguide.

17. The multi-chip photonic assembly of claim 13, wherein the second waveguide has a third vertical dimension that is smaller than the second vertical dimension.

18. A multi-chip photonic assembly, comprising:
   a first photonic integrated circuit including a first waveguide having:
      a first region that occupies a first horizontal plane and has a first vertical dimension; and
      a second region that has a second vertical dimension that is larger than the first vertical dimension, the second region comprising a first waveguide material and a second waveguide material overlaying the first waveguide material and having a lower refractive index than the first waveguide material; and
   a second photonic integrated circuit, including a second waveguide, stacked vertically over the first photonic integrated circuit, the second waveguide having:
      a third region that occupies a second horizontal plane and has a third vertical dimension; and
      a fourth region that has a fourth vertical dimension that is larger than the third vertical dimension, the fourth region comprising a third waveguide material and a fourth waveguide material overlaying third first waveguide material and having a lower refractive index than the third waveguide material; wherein:
   the second region is positioned in the second horizontal plane; and
   the second region and the fourth region change a mode of light travelling between the first photonic integrated circuit and the second photonic integrated circuit.

19. The multi-chip photonic assembly of claim 18, wherein:
   the first region comprises a first segment of the first waveguide material;
   the second region comprises a second segment of the first waveguide material; and
   a width of the second segment tapers adiabatically in the second region.

20. The multi-chip photonic assembly of claim 19, wherein:
   the third region comprises a third segment of the third waveguide material;
   the second region comprises a fourth segment of the fourth waveguide material; and
   a width of the fourth segment tapers adiabatically in the fourth region.

21. The multi-chip photonic assembly of claim 19 wherein the second segment terminates prior to a distal end of the second region.

22. The multi-chip photonics assembly of claim 18, wherein the first waveguide material and the third waveguide material are the same material.

23. The multi-chip photonics assembly of claim 18, wherein the second waveguide material and the fourth waveguide material are the same material.

24. The multi-chip photonics assembly of claim 18, wherein:
   the first photonic integrated circuit defines a cavity; and
   the fourth region extends at least partially into the cavity.

* * * * *